(12) United States Patent
Fink et al.

(10) Patent No.: US 8,900,448 B2
(45) Date of Patent: Dec. 2, 2014

(54) TREATMENT DEVICE

(71) Applicant: Hydro International plc, Clevedon (GB)

(72) Inventors: Jeremy Fink, Portland, ME (US); Andrew Pearson Nancollis, Weston-Super-Mare (GB); Robert Yaw Gyamfi Andoh, South Portland, ME (US); Keith Garry Hutchings, Weston-Super-Mare (GB)

(73) Assignee: Hydro International PLC, Clevedon (GB)

( * ) Notice: Subject to any disclaimer, the term of this patent is extended or adjusted under 35 U.S.C. 154(b) by 0 days.

(21) Appl. No.: 13/928,827

(22) Filed: Jun. 27, 2013

(65) Prior Publication Data

US 2014/0001106 A1  Jan. 2, 2014

Related U.S. Application Data

(62) Division of application No. 13/112,185, filed on May 20, 2011.

(51) Int. Cl.
*B01D 35/00* (2006.01)
*B01D 21/26* (2006.01)
*E21B 43/00* (2006.01)
*E03F 5/04* (2006.01)
*B01D 21/24* (2006.01)
*B01D 21/00* (2006.01)
*C02F 1/00* (2006.01)
*E03F 5/14* (2006.01)
*C02F 3/32* (2006.01)
*C02F 1/38* (2006.01)
*C02F 103/00* (2006.01)

(52) U.S. Cl.
CPC ............ *C02F 1/00* (2013.01); *C02F 2103/001* (2013.01); *E03F 5/0404* (2013.01); *B01D 21/2433* (2013.01); *B01D 21/0042* (2013.01); *B01D 21/0012* (2013.01); *E03F 5/14* (2013.01); *B01D 21/245* (2013.01); *B01D 21/0006* (2013.01); *C02F 3/32* (2013.01); *C02F 1/38* (2013.01)
USPC .......... 210/90; 210/510.1; 210/299; 210/304; 210/512.1; 210/97; 166/266; 166/270

(58) Field of Classification Search
None
See application file for complete search history.

(56) References Cited

U.S. PATENT DOCUMENTS

| | | | | |
|---|---|---|---|---|
| 4,014,284 | A | * | 3/1977 | Read .............................. 116/267 |
| 4,034,284 | A | * | 7/1977 | Peplow et al. ................ 324/508 |
| 2004/0035767 | A1 | * | 2/2004 | Pahl et al. ...................... 210/111 |
| 2006/0163147 | A1 | * | 7/2006 | Dierkes et al. ................ 210/446 |

FOREIGN PATENT DOCUMENTS

CA  2545816  * 11/2007

* cited by examiner

*Primary Examiner* — Nam Nguyen
*Assistant Examiner* — Richard Gurtowski
(74) *Attorney, Agent, or Firm* — Marvin Petry; Stites & Harbison PLLC

(57) ABSTRACT

A treatment device for stormwater is provided that comprises a container which in use contains a growing medium and a hydrodynamic separator located within the container. The hydrodynamic separator comprises a separation chamber, an inlet duct extending from the outside of the container to the separation chamber, a solids outlet; and a liquid outlet that opens into the container. In use, liquid flow containing solids enters the separation chamber through the inlet duct and is caused to swirl within the separation chamber, thereby causing solids to exit the separation chamber through the solids outlet and liquid to exit the separation chamber through the liquid outlet and to flow into the growing medium.

10 Claims, 3 Drawing Sheets

TREATMENT DEVICE

CROSS REFERENCE TO RELATED APPLICATIONS

This application is a divisional of application Ser. No. 13/112,185, filed May 20, 2011 (which is hereby incorporated by reference).

FIELD OF THE INVENTION

The present invention relates to a treatment device for treatment of a liquid flow containing solids and associated pollutants. The invention is particularly, although not exclusively, concerned with the treatment of run-off water from pavements, roadways and similar surfaces.

BACKGROUND OF THE INVENTION AND PRIOR ART

It is known, for example from US 2007/0256966, to treat stormwater through a bio-retention system. In such a system, stormwater, for example from the roof of a building, is directed to a container which contains a growing medium supporting plant growth. The stormwater percolates through the growing medium to the bottom of the container, and then flows to a mains drainage system. The stormwater thus provides a water supply for the growing plant, and the growing medium also filters the water to remove pollutants. Furthermore, the growing medium in the container serves as a retention device which regulates the flow of stormwater to the main drainage system, so as to reduce the load on the main drainage system during periods of heavy rainfall.

A problem with such systems is that the stormwater reaching the container may carry with it various pollutants which can interfere with the proper function of the growing medium. For example, if the container receives stormwater run-off from ground level surfaces such as roadways and pedestrian pavements, stormwater flow may include solid materials such as grit, leaves and litter and other pollutants associated with solids, such as heavy metals and other toxicants. It is preferable for such material not to be deposited on the growing medium.

Separators for separating such solid material from stormwater flows are known. For example, hydro-dynamic separators are low energy devices which operate on the principle of allowing a liquid containing suspended solid material to rotate in a cylindrical vessel so that the solid material falls under gravity to the base and there is swept to a central lower outlet by an inward sweeping effect caused by complex flow patterns in the device.

Such devices have been used in sewage treatment for separating hard grit from the incoming raw sewage, with the resultant de-gritted sewage then being passed to a conventional sewage treatment plant. They are also used as stormwater overflows, upstream of conventional sewage treatment works to ensure that gross contamination is separated from liquid waste discharged to watercourses during storm conditions when the sewage treatment works is unable to cope with the high flow. Separators of this type are described in GB2082941 and GB2158741, for example.

SUMMARY OF THE INVENTION

The invention relates to a treatment device for treatment of a liquid flow containing solids, the treatment device comprising: a container which in use contains a growing medium; and a hydrodynamic separator located within the container, the hydrodynamic separator comprising: a separation chamber; an inlet duct extending from the outside of the container to the separation chamber; a solids outlet; and a liquid outlet that opens into the container, wherein in use liquid flow containing solids enters the separation chamber through the inlet duct and is caused to swirl within the separation chamber, thereby causing solids to exit the separation chamber through the solids outlet and liquid to exit the separation chamber through the liquid outlet and to flow into the growing medium.

The upper end of the separation chamber may have an opening which constitutes the liquid outlet so that in use liquid can overflow from the separation chamber into the growing medium.

The hydrodynamic separator may further comprise a cover located over the upper end of the separation chamber, the cover having a fluid channel for the passage of liquid overflowing from the separation chamber into the growing medium.

The treatment device may further comprise an outer cylindrical wall defining the separation chamber; an annular baffle disposed inwardly of the outer cylindrical wall; and an annular floatables trap defined between the outer cylindrical wall and the annular baffle.

The hydrodynamic separator may further comprise a permeable screen located in the separation chamber to screen fluid flowing from the separation chamber to the liquid outlet. The hydrodynamic separator may further comprise an indicator arranged to indicate when the screen is blinded. The indicator may comprise an indicator member which is responsive to pressure in the separation chamber, the indicator member being displaceable between a first condition representing a relatively low pressure in the separation chamber to signify flow through the screen, and a second condition representing a relatively high pressure in the separation chamber to signify blinding of the screen.

The hydrodynamic separator may further comprise a conical base sloping downwards towards the solids outlet; and a baffle disposed above the solids outlet, the baffle forming with the conical base an annular outlet slot.

The hydrodynamic separator may further comprise a solids container arranged to collect solids exiting the separation chamber through the solids outlet, wherein the solids container is removable from the hydrodynamic separator.

The treatment device may further comprise a drainage arrangement which is disposed within the container and which in use is covered by the growing medium, the drainage arrangement comprising a permeable channel in fluid communication with an outlet pipe which extends to the outside of the container, wherein in use liquid flows from the growing medium into the permeable channel and exits the container through the outlet pipe. The permeable channel may comprise a perforated pipe.

The invention also relates to a hydrodynamic separator for treatment of a liquid flow containing solids comprising: a separation chamber; an inlet; a solids outlet; a liquid outlet; a permeable screen located in the separation chamber which divides the separation chamber into a first part into which the inlet and solids outlet open and a second part into which the liquid outlet opens; and an indicator arranged to indicate when the screen is blinded, wherein in use liquid flow containing solids enters the separation chamber through the inlet and is caused to swirl within the separation chamber, thereby causing solids to exit the separation chamber through the solids outlet and liquid to exit the separation chamber through the liquid outlet.

The indicator may comprise an indicator member which is responsive to pressure in the first part of the separation chamber, the indicator member being displaceable between a first condition representing a relatively low pressure in the first part of the separation chamber to signify flow through the screen, and a second condition representing a relatively high pressure in the first part of the separation chamber to signify blinding of the screen. The indicator member may be an inflatable member which is in fluid communication with the first part of the separation chamber such that if in use the screen becomes blinded, the pressure within the first part of the separation chamber causes the inflatable member to inflate, thereby indicating that the screen is blinded. A duct may be provided that extends from the outside of the separation chamber to a position within the first part of the separation chamber for providing fluid communication between the inflatable member and the first part of the separation chamber.

The indicator member may be visible at least in the second condition.

The invention also concerns a separator for treatment of a liquid flow containing solids comprising: a separation chamber; an inlet; a solids outlet; and a liquid outlet, wherein in use liquid flow containing solids enters the separation chamber through the inlet with solids exiting the separation chamber through the solids outlet and liquid exiting the separation chamber through the liquid outlet; the separator further comprising a solids container arranged to collect solids exiting the separation chamber through the solids outlet, wherein the solids container is removable from the separator.

The solids container may be part of a removable internal module that in use is located within the separator and is removable through the liquid outlet.

An upper end of the separation chamber may be open and constitute the liquid outlet so that in use liquid can overflow from the separation chamber.

The removable internal module may further comprise a permeable screen which in use is located in the separation chamber and divides the separation chamber into a first part into which the inlet and solids outlet open and a second part into which the liquid outlet opens.

The separator may further comprise an indicator arranged to indicate when the screen is blinded. The indicator may be part of the removable internal module. The internal module may be attached to a cover that in use is located over the open upper end of the separation chamber, the cover having a fluid channel for the passage of liquid overflowing from the separation chamber.

The separator may further comprise a drainage channel wherein when the solids container is removed, the separator chamber is in fluid communication with the drainage channel so that flow from the separation chamber can exit through the drainage channel.

BRIEF DESCRIPTION OF THE DRAWINGS

The invention may comprise any combination of the features and/or limitations referred to herein, except combinations of such features as are mutually exclusive.

Embodiments of the present invention will now be described, by way of example only, with reference to the accompanying drawings, in which.

DETAILED DESCRIPTION OF PREFERRED EMBODIMENTS

Figure 1:
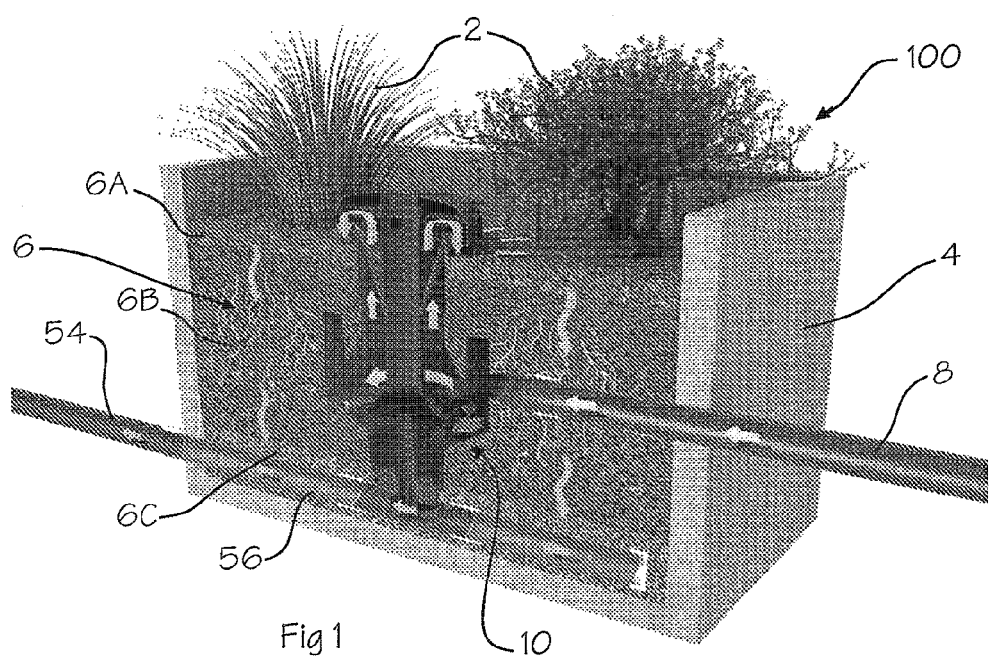
FIG. 1 schematically shows a treatment device according to an embodiment of the present invention.

FIG. 1 shows a treatment device 1 for treating a liquid flow containing solids. The treatment device 1 comprises a container in the form of a planter 100 within which is located a hydrodynamic separator 10. The planter comprises a pre-cast concrete structure having an outer wall 4. In use, the planter 100 is filled with a filter media 6 which serves as a growing medium for one or more plants 2. The filter media may, for example, comprise a layer of mulch 6A, a soil mixture 6B including a combination of organic, an inorganic material, and a permeable bed of coarse material such as chippings 6C or other combinations of media mixes tailored to suit the treatment objective and planting requirements. In the embodiment shown, the hydrodynamic separator 10 is disposed mainly in the filter media 6, but its top portion projects above the level of the mulch 6A. An inlet duct 8 extends from the outside of the planter 100 to the hydrodynamic separator 10 and an outlet duct 54 extends from the wall 4 of the planter 100. In other embodiments, the hydrodynamic separator 10 may be disposed within the planter 100 but not embedded within the filter media 6.

Figure 2:
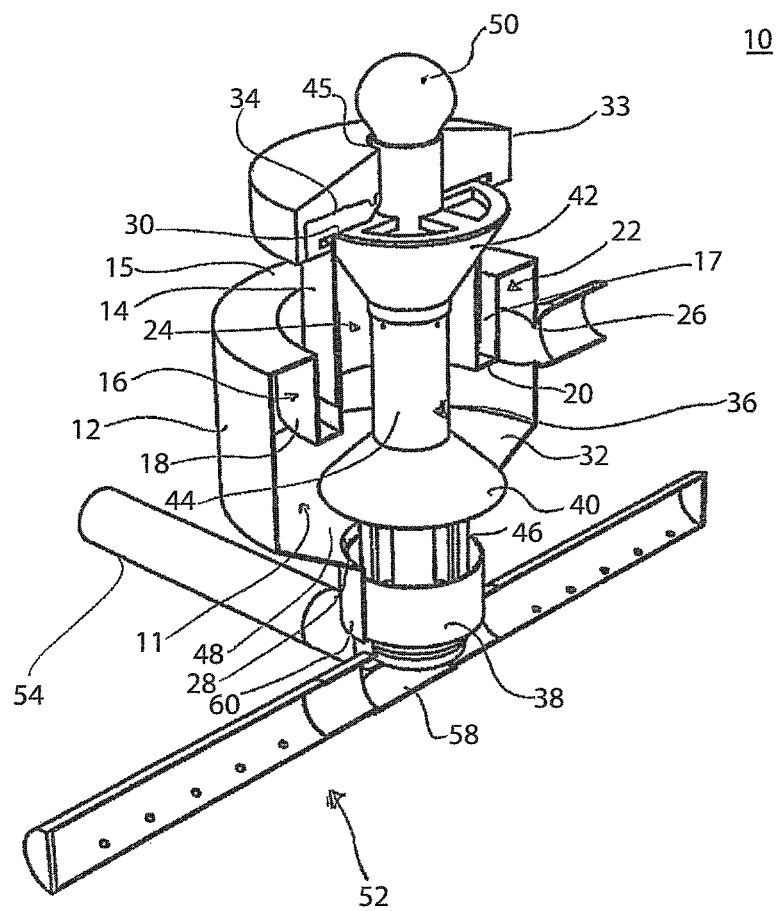
FIG. 2 schematically shows a sectioned view of the hydrodynamic separator which is part of the treatment device of FIG. 1.

FIG. 2 is a sectioned view of the hydrodynamic separator 10. The separator 10 comprises an outer cylindrical wall 12 which defines a separation chamber 11. An annular floatables trap 16, having a closed top 15 is defined between the outer wall 12 and an intermediate wall 18 which extends downwardly from the top 15. An inner cylindrical wall 14 is connected at its lower end to the bottom edge of the wall 18 by a radially extending portion 20, and extends upwardly beyond the top 15 to project above the level of the filter media 6, as shown in FIG. 1.

The intermediate wall 18 and the inner wall 14 define an annular baffle 22 projecting downwardly into the chamber 11. A corresponding annular channel 17 is provided on the outside of the separator 10. When the separator 10 is located in the planter 100 and covered with soil, the annular channel 17 is filled with the filter media 6.

The separator 10 is provided with an inlet 26, a solids outlet 28 and a liquid outlet 30. The inlet duct 8 opens into the separation chamber 11 at the inlet 26, which is provided in the outer cylindrical wall 12 and opens into the chamber 11 at the lower region of the floatables trap 16. The separator 10 has a conical base 32 which slopes downwards towards the solids outlet 28. The inner wall 14 defines an outlet duct 24 which is open at its upper end to constitute the liquid outlet 30.

Figure 3:
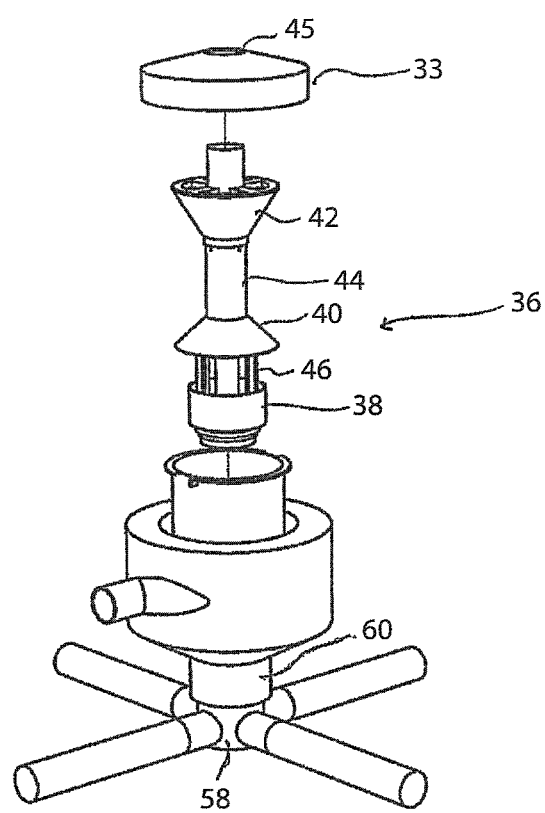
FIG. 3 schematically shows the hydrodynamic separator of FIG. 2 with the internal module removed.

The separator 10 is provided with a removable internal module 36 that during normal use is located within the separator as shown in FIGS. 1 and 2. With reference to FIG. 3, the module 36 comprises a hollow stem 44 which supports a solids pot 38 provided towards the bottom of the module 36, a conical baffle 40 located above the solids pot 38 and a conical permeable screen 42 located towards the top of the module 36. The hollow interior of the stem 44 is open at both the lower end and the upper end. The solids pot 38 is attached to the conical baffle 40 by struts 46.

When the module 36 is located within the separator 10 (as in FIG. 2), the solids pot 38 is fitted within the solids outlet 28 and is arranged to collect solids, such as grit, exiting the separation chamber 11 through the solids outlet 28. The conical baffle 40 is positioned above the solids outlet 28 so that an annular outlet slot 48 is defined between the periphery of the baffle 40 and the conical base 32. The periphery of the conical screen 42 is in contact with the upper edge of the inner cylindrical wall 14 so that the screen 42 traps any solids in the flow towards the liquid outlet 30.

A cover 34 covers the upper end of the outlet duct 24 and is provided with channels 36 for liquid overflowing from the liquid outlet 30. An upper end portion of the stem 44 of the removable module 34 extends into a hole 45 in the cover 34. An indicator device in the form of an inflatable bulb 50 is attached to the stem 44 such that it is in fluid communication with the hollow interior of the stem 44.

The treatment device 1 further comprises a drainage arrangement 52 located within the container 100. The drainage arrangement 52 comprises permeable channels in the form of four perforated pipes 56 in fluid communication with one another and with the outlet duct 54. The perforated pipes 56 all lie in a common horizontal plane at right angles to one another. It will be appreciated that more or fewer perforated pipes may be used and that the perforated pipes need not be arranged at right angles to one another. One of the pipes 56 extends to the wall 4 and is attached to the outlet duct 54. The four pipes 56 communicate with each other through a central fitting 58 which is secured to a cylindrical extension 60 which projects downwardly from the solids outlet 28 and receives the solids pot 38. When the module 36 is removed from the hydrodynamic separator 10 the drainage arrangement 52 is in fluid communication with the separation chamber 11 through the solids outlet 28, enabling water in the separator 10 to drain down through the pipes 56 to the outlet duct 54. When the module 36 is fitted within the separator 10, the solids pot 38 acts as a plug and provides a seal between the separation chamber 11 and the drainage arrangement 52.

In use, the planter 100 of the treatment device 1 is filled with a filter media 6 to bury the drainage arrangement 52 and the separator 10 up to a level just below the cover 32. Plants are planted in the filter media 6. The inlet duct 8 is connected to a source of stormwater, so as to receive surface water run-off from roadways, roofs and other surfaces. As will be appreciated, stormwater from such surfaces will typically contain solids such as grit, litter, leaves, etc as well as liquid contaminants such as oil.

The flow of stormwater enters the separation chamber 11 of the separator 10 through the inlet 26. The inlet 26 is oriented to direct the inflowing water in a tangential direction so as to generate swirl in the separation chamber 11. Heavy solids, such as grit, in the stormwater settle towards the conical base 32 and are swept through the annular outlet slot 48 and exit the separation chamber 11 through the solids outlet 28 to collect in the solids pot 38. The water passes under the annular baffle 16 formed by the intermediate wall 18 and the inner wall 14 and flows upwardly through the outlet duct 24. The water passes through the permeable screen 42, which traps any debris not already separated from the liquid flow. The flow then overflows from the outlet duct 24 and through the fluid channels 34 provided in the cover 33 into the filter media 6 contained in the planter 100.

The drainage arrangement 52 receives the treated water which flows into the perforated pipes 56 and then exits the treatment device 1 through the outlet duct 54. In heavy storm conditions, at least some of the exiting water may be discharged directly to a watercourse, but under normal flow it may be conveyed to a wastewater treatment facility.

An additional function of the treatment device 1 is to retard the flow of stormwater to the mains drainage system and to the downstream treatment facility. Thus, the filter media serves as a bio-retention device enabling water to be stored in the planter 100 to be released relatively slowly to the pipes 56 and thence to the mains drainage system. It can be appreciated that in some embodiments the filter media may not provide sufficient flow attenuation characteristics and in these instances there will be the need to deploy a positive passive flow control device such as a vortex valve on the outlet duct 54. Some of the water will be taken up by the plants 2, thus further reducing the load on the mains drainage system and treatment facility.

As water passes through the filter media 6, fine particles and some liquid contaminants are retained by the filter media. Some pollutants will be neutralised by microbial action in the filter media or taken up by. the plants 2. The filter media 6 thus treats the water percolating through it so that the water reaching the drainage arrangement 52 has a substantially lower contaminant content than that exiting the separator 10.

The inflatable bulb 50 is normally accommodated wholly within the upper region of the hollow stem 44, and is thus not readily visible from the outside. If the screen 42 becomes blocked, or partially blocked, then the rate of flow of liquid through the screen is reduced. This causes the pressure in the separation chamber 11 to increase. This pressure increase is communicated to the interior of the stem 44 beneath the baffle 40 and causes the inflatable bulb 50 to inflate, and so to engage the stem 44, as shown in FIG. 2. The inflated bulb 50 thus provides a visual indication that the screen 42 is blocked (or blinded), so that appropriate maintenance can be carried out.

For maintenance, the module 36 can be removed from the separator 10 by hand. Removal of the module 36 enables the screen 42 to be cleaned or replaced and the solids pot 38 to be emptied. When the module 36 is removed from the separator 10, the separation chamber 11 is in fluid communication with the outlet duct 56 through the solids outlet 28. This allows any liquid within the separation chamber 11, including any floatable matter trapped in the floatables trap 16, to exit the treatment device 1 through the outlet duct 56. Floatable matter trapped in the floatables trap 16 may also be swept into the solids pot 38 by the liquid exiting the separator 10 through the solids outlet 28.

We claim:

1. A hydrodynamic separator for treatment of a liquid flow containing solids comprising:
    a separation chamber;
    an inlet;
    a solids outlet;
    a liquid outlet;
    a permeable screen located in the separation chamber which divides the separation chamber into a first part into which the inlet and solids outlet open and a second part into which the liquid outlet opens;
    wherein in use liquid flow containing solids enters the separation chamber through the inlet and is caused to swirl within the separation chamber, thereby causing solids to exit the separation chamber through the solids outlet and liquid to exit the separation chamber through the liquid outlet, and
    an indicator arranged to indicate when the screen is blinded, the indicator being in fluid communication with the first part of the separation chamber such that if in use the screen becomes blinded, the pressure within the first part of the separation chamber causes an inflatable member to inflate, which indicates that the screen is blinded.

2. A hydrodynamic separator according to claim 1, wherein a duct is provided that extends from the outside of the separation chamber to a position within the first part of the separation chamber for providing fluid communication between the inflatable member and the first part of the separation chamber.

3. A hydrodynamic separator according to claim 1, wherein in use the indicator is visible when the inflatable member is inflated.

4. A separator for treatment of a liquid flow containing solids comprising:
- a separation chamber;
- an inlet;
- a solids outlet;
- a liquid outlet;
- a permeable screen located in the separation chamber which divides the separation chamber into a first part into which the inlet opens and a second part which communicates with the liquid outlet; and
- an indicator arranged to indicate when the screen is blinded, the indicator being in fluid communication with the first part of the separation chamber such that if in use the screen becomes blinded, the pressure within the first part of the separation chamber causes an inflatable member to inflate, which indicates that the screen is blinded, wherein in use liquid flow containing solids enters the separation chamber through the inlet with solids exiting the separation chamber through the solids outlet and liquid exiting the separation chamber through the liquid outlet; and the separator further comprising a solids container arranged to collect solids exiting the separation chamber through the solids outlet, wherein the solids container is removable from the separator.

5. A separator according to claim 4, wherein the solids container is part of a removable internal module that in use is located within the separator and is removable through the liquid outlet.

6. A separator according to claim 5, wherein an upper end of the separation chamber is open and constitutes the liquid outlet so that in use liquid can overflow from the separation chamber.

7. A separator according to claim 4, wherein the permeable screen divides the separation chamber into a first part into which the inlet and solids outlet open and a second part into which the liquid outlet opens.

8. A separator according to claim 5, wherein the indicator is part of the removable internal module.

9. A separator according to claim 6, wherein the internal module is attached to a cover that in use is located over the open upper end of the separation chamber, the cover having a fluid channel for the passage of liquid overflowing from the separation chamber.

10. A separator according to claim 4, wherein the separator further comprises a drainage channel wherein when the solids container is removed, the separator chamber is in fluid communication with the drainage channel so that flow from the separation chamber can exit through the drainage channel.

* * * * *